United States Patent
Bilbrey et al.

(10) Patent No.: US 8,890,815 B2
(45) Date of Patent: Nov. 18, 2014

(54) INCORPORATING CHROMATIC SENSORS IN COMPUTER MICE

(75) Inventors: Brett Bilbrey, Sunnyvale, CA (US); Michael F. Culbert, Monte Sereno, CA (US)

(73) Assignee: Apple Inc., Cupertino, CA (US)

( * ) Notice: Subject to any disclaimer, the term of this patent is extended or adjusted under 35 U.S.C. 154(b) by 726 days.

(21) Appl. No.: 12/570,102

(22) Filed: Sep. 30, 2009

(65) Prior Publication Data

US 2011/0074683 A1 Mar. 31, 2011

(51) Int. Cl.
| | |
|---|---|
| G06F 3/033 | (2013.01) |
| G06F 3/038 | (2013.01) |
| H04N 1/00 | (2006.01) |
| G06F 3/0354 | (2013.01) |
| G06F 3/03 | (2006.01) |
| H04N 1/107 | (2006.01) |

(52) U.S. Cl.
CPC ............ *G06F 3/0304* (2013.01); *G06F 3/0383* (2013.01); *H04N 1/00347* (2013.01); *H04N 1/107* (2013.01); *H04N 2201/0081* (2013.01); *G06F 3/03543* (2013.01); *H04N 1/0044* (2013.01); *H04N 2201/0089* (2013.01)
USPC .......................................................... 345/166

(58) Field of Classification Search
None
See application file for complete search history.

(56) References Cited

U.S. PATENT DOCUMENTS

| | | | |
|---|---|---|---|
| 5,701,175 A | 12/1997 | Kostizak et al. | |
| 5,963,333 A | 10/1999 | Walowit et al. | |
| 5,994,710 A | 11/1999 | Knee et al. | |
| 6,455,840 B1* | 9/2002 | Oliver et al. | 250/222.1 |
| 6,573,915 B1* | 6/2003 | Sivan et al. | 715/781 |
| 6,697,053 B2 | 2/2004 | Kajihara | |
| 6,867,549 B2 | 3/2005 | Cok et al. | |
| 7,088,338 B2 | 8/2006 | Ahn | |
| 7,154,477 B1 | 12/2006 | Hotelling et al. | |
| 7,220,956 B2* | 5/2007 | Feldmeier et al. | 250/221 |
| 7,256,387 B2* | 8/2007 | Kwak | 250/221 |
| 7,301,531 B2* | 11/2007 | Wu | 345/163 |
| 2002/0166950 A1* | 11/2002 | Bohn | 250/208.1 |
| 2005/0057510 A1* | 3/2005 | Baines et al. | 345/166 |
| 2005/0110746 A1* | 5/2005 | Hou | 345/156 |

(Continued)

FOREIGN PATENT DOCUMENTS

| | | | | |
|---|---|---|---|---|
| KR | 20020050803 | 6/2002 | | |
| WO | WO 2010008866 A2 * | 1/2010 | | G01F 1/32 |

*Primary Examiner* — Wayne Young
*Assistant Examiner* — Mark Fischer
(74) *Attorney, Agent, or Firm* — Brownstein Hyatt Farber Schreck, LLP

(57) ABSTRACT

Methods and apparatuses are disclosed that incorporate chromatic sensors in a mouse to vary the operation of the mouse. Some embodiments may include a method of modifying the programming of a mouse that includes sampling, with the chromatic sensor, an optical property of a surface upon with the mouse is operating (such as color of the surface), and then dynamically modifying the programming of the mouse based upon the sampled optical property. In this manner, the operation of the mouse, such as tracking resolution, may be customized based upon the properties of the surface upon which the mouse is operating. Other embodiments may include utilizing the mouse with the chromatic sensor as a scanner to display images on a housing of the mouse.

7 Claims, 6 Drawing Sheets

(56) References Cited

U.S. PATENT DOCUMENTS

| | | |
|---|---|---|
| 2006/0044276 A1 | 3/2006 | Baer et al. |
| 2007/0215792 A1* | 9/2007 | Cheah et al. ............... 250/221 |
| 2009/0153486 A1 | 6/2009 | Bohn |
| 2009/0195505 A1* | 8/2009 | Chen et al. ............... 345/166 |
| 2011/0012838 A1* | 1/2011 | Pance et al. ............... 345/173 |
| 2011/0025604 A1* | 2/2011 | Chang ............... 345/166 |
| 2011/0037700 A1* | 2/2011 | Chatow et al. ............... 345/166 |
| 2011/0193780 A1* | 8/2011 | Schaaf ............... 345/163 |

\* cited by examiner

INCORPORATING CHROMATIC SENSORS IN COMPUTER MICE

BACKGROUND OF THE INVENTION

I. Technical Field

The present invention relates generally to computer mice, and more particularly to methods and apparatuses that incorporate chromatic sensors in computer mice.

II. Background Discussion

Electronic devices are ubiquitous in society and can be found in everything from wristwatches to computers. Depending upon particular implementations of the electronic devices, each device may have a different mechanism for inputting data. For example, some electronic devices, such as computers, often include mice. During operation of the mouse, the user may indicate movement of an indicator on the computer's screen by moving a mouse containing a light-based sensor over a surface. Reflections of the light may vary according to changes in the texture of the surface, thereby allowing the computing device to track movement of the mouse and correspondingly move the indicator on the screen. However, determining changes in a mouse's position as a result of reflected light is not without its problems.

For example, if the mouse is placed on certain surfaces, it may be difficult to determine if the mouse is moving. These problematic surfaces may include surfaces where the surface is relatively monochromatic, as such surfaces reflect light fairly uniformly and thus provide few changes in reflectance. Examples include surfaces that are substantially all white or all black with few or no contrasting colors. These problematic surfaces also may include surfaces with glass placed over them, such as desktops with protective glass overlays, where the angle of reflection may be skewed such that the image sensor in the mouse cannot detect the reflected light accurately. Accordingly, methods and apparatuses are needed that overcome problems associated with conventional approaches.

SUMMARY

Some embodiments may improve a mouse's performance on these problematic surfaces by implementing a mouse including a light source, an image sensor coupled to the light source, and a microprocessor coupled to the image sensor, wherein the programming of the microprocessor is capable of modifying a responsiveness of the mouse based upon feedback from the image sensor.

Other embodiments may improve a mouse's performance on these problematic surfaces by emanating a light onto a surface on which the mouse is operating, capturing a reflection of the emanated light with an image sensor, determining optical properties of the surface based upon the captured reflection, and dynamically modifying the programming of the mouse based upon the determined optical properties of the surface.

In addition to providing the capability to dynamically modify the programming of a mouse, some embodiments of the mouse may be capable of being used to scan images and display them on its housing because of the inclusion of a chromatic sensor. That is, the mouse with the chromatic sensor may be used as a handheld scanner, thereby allowing the user to scan and view images without using a computer to view the images.

Still other embodiments may take the form of a computing device including a microprocessor and a mouse coupled to the microprocessor, where the mouse is capable of moving an indicator. This computer may further include a light source, a chromatic sensor coupled to the light source, the chromatic source capable of sampling an image of a surface upon which the mouse is operating, and a microprocessor coupled to the light source and the chromatic sensor, where a program included in the microprocessor is modified based upon the sampled image.

BRIEF DESCRIPTION OF THE DRAWINGS

The use of the same reference numerals in different drawings indicates similar or identical items.

DETAILED DESCRIPTION OF THE INVENTION

Some embodiments may improve a mouse's performance on problematic surfaces by incorporating one or more chromatic sensors in the mouse and then modifying the mouse's programming based upon readings from the chromatic sensor. For example, if the mouse is being operated on a surface where the surface's chromatic changes are not significant enough to represent mouse movement, e.g., an all white surface, then the sampling resolution of the mouse may be dynamically modified. In other words, the mouse may have different operating characteristics based upon the chromatic properties of the surface upon which it is operating. For example, the power of a light source within the mouse may be adjusted based on the characteristics of the surface to conserve power. Alternatively, the rate at which the mouse samples the surface on which it is operating may be dynamically adjusted based upon the chromatic characteristics of the surface so as to adjust the mouse's "resolution" based upon the chromatic content of the surface on which the mouse is being operated.

In addition to providing the capability to dynamically modify the programming of a mouse, some embodiments of the mouse may be capable of being used to scan images and display them on its housing because of the inclusion of a chromatic sensor. That is, a mouse with a chromatic sensor may be used as a handheld scanner, thereby allowing the user to scan and view images without using a computer to view the images.

Although one or more of the embodiments disclosed herein may be described in detail with reference to a particular electronic device, the embodiments disclosed should not be interpreted or otherwise used as limiting the scope of the disclosure, including the claims. In addition, one skilled in the art will understand that the following description has broad application. Accordingly, the discussion of any embodiment is meant only to be exemplary and is not intended to suggest that the scope of the disclosure, including the claims, is limited to these embodiments.

Figure 1:
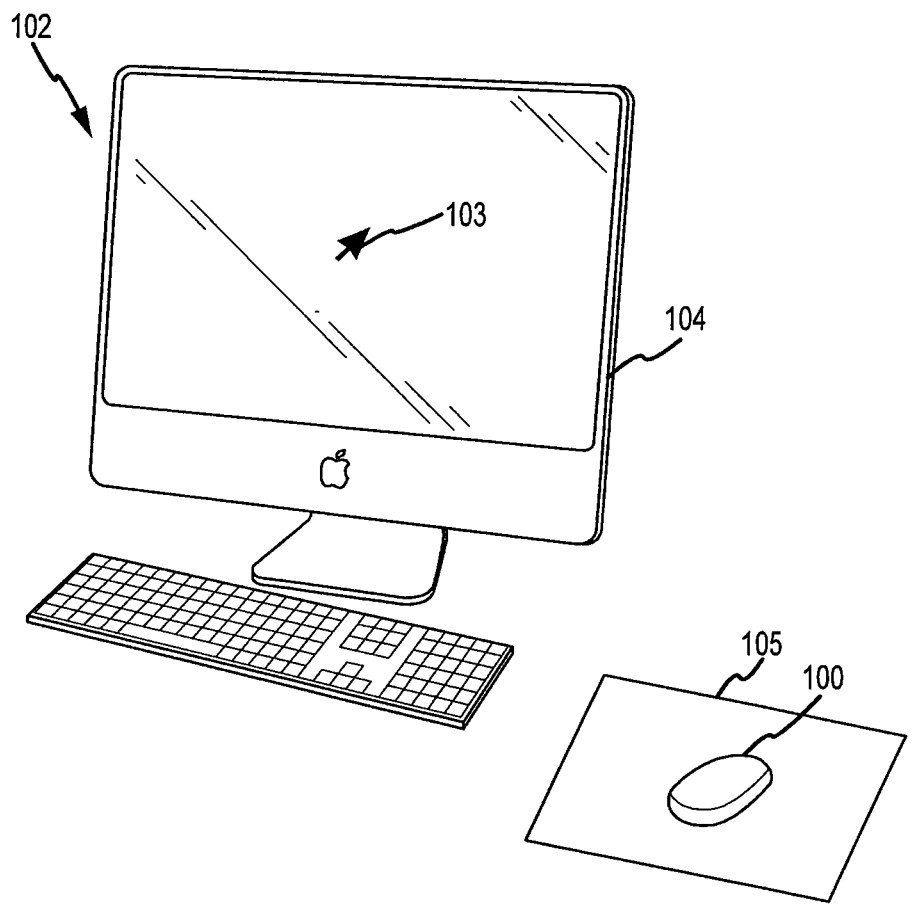
FIG. 1 illustrates a computer system including a mouse including a chromatic sensor.

Referring now to FIG. 1, a mouse 100 that incorporates a chromatic sensor is shown in accordance with at least one embodiment. As is shown in FIG. 1, the mouse 100 may couple to a computer 102 wirelessly, or, in alternate embodiments, the mouse 100 may couple to the computer 102 via a hard-wired connection. It should be appreciated that while this detailed description may focus on the general use of the mouse 100 in the context of the computer system 102, the mouse 100 may be used in other contexts as well. For example, as will be described in detail below with respect to FIGS. 5-7, the mouse 100 may be used independently of any computer system.

The mouse 100 is a user-operated input device that allows a user to position an indicator 103 on a display screen 104. In this manner, the mouse 100 may be configured to provide positional information to the computer system 102; thus, positional information generally serves as input to control the movement of the mouse along a surface 105. Depending upon the particular embodiment, the surface 105 may include a variety of materials and/or patterns. For example, in some embodiments, the surface 105 may be a mouse pad, while in other embodiments the surface 105 may be a desktop. As mentioned above, some surfaces are more problematic in tracking the movement of the mouse 100 than others.

The positional movement of the mouse 100 along the surface 105 may be used by the computer system 102 to move the indicator 103 on the screen 104. For example, when the mouse 100 is moved forward by a user, the cursor is moved vertically up on a display screen 104. Generally, the movement of the indicator 103 on the screen 104 is a function of the tracking ability of the mouse 100. That is, the response of the indicator 103 to movement by a user is generally related to the mouse's 100 ability to track its own movement and relay that movement to the computer 102. As will be described in greater detail below, the mouse 100 may include one or more chromatic sensors that sample the optical properties of the surface 105 and adjust the tracking ability of the mouse 100 accordingly. In this manner, surfaces that present tracking problems for conventional mice, such as surfaces where changes in the surface color are too minor, or surfaces that have glass overlays, may be adequately tracked by the mouse 100.

Figure 2:
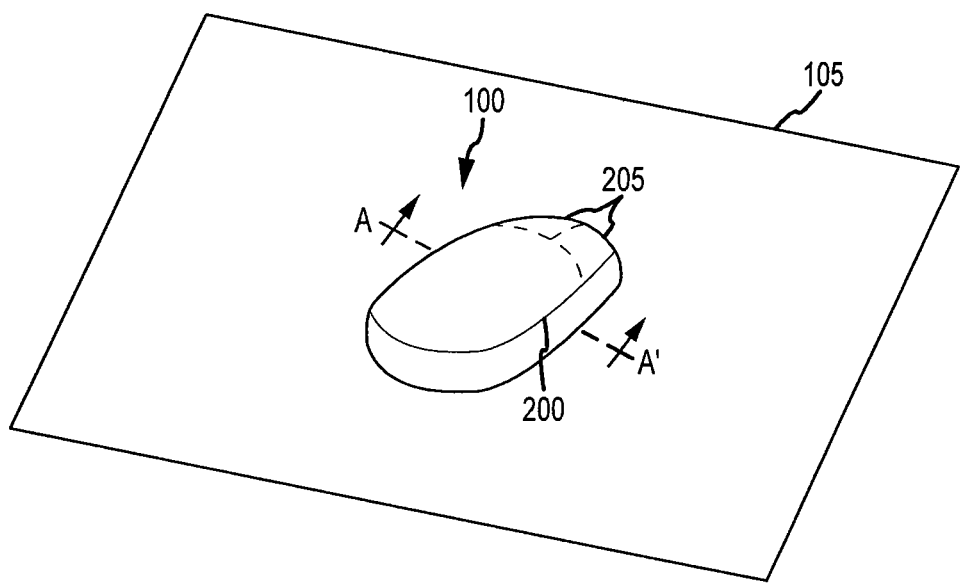
FIG. 2 illustrates a perspective view of a mouse including a chromatic sensor.

FIG. 2 is a perspective view of the mouse 100 resting on the surface 105. As shown, the mouse 100 includes a housing 200 for moving the mouse along the surface 105 and for gripping and moving the mouse 100. The housing 200 may include one or more user input mechanisms, such as buttons 205 (shown in FIG. 2 in phantom), rotating wheels (not specifically shown in FIG. 2), or the like. During operation of the mouse 100, the user may provide input to the computer system 102, for example, by actuating one of the buttons 205 while positioning the mouse 100 across the surface 105 such that the indicator 103 is located at a desired destination on the screen 104.

The general shape or form of the mouse 100 may be defined by the housing 200 and may be manufactured from a variety of materials, such as plastic, metal, etc. In this manner, the contour of the mouse housing 200 may embody the outward physical appearance of the mouse 100. Although the housing 200 is shown in FIG. 2 as generally ovular in physical appearance, it should be appreciated that the housing 200 may take on a variety of physical forms.

Figure 3:
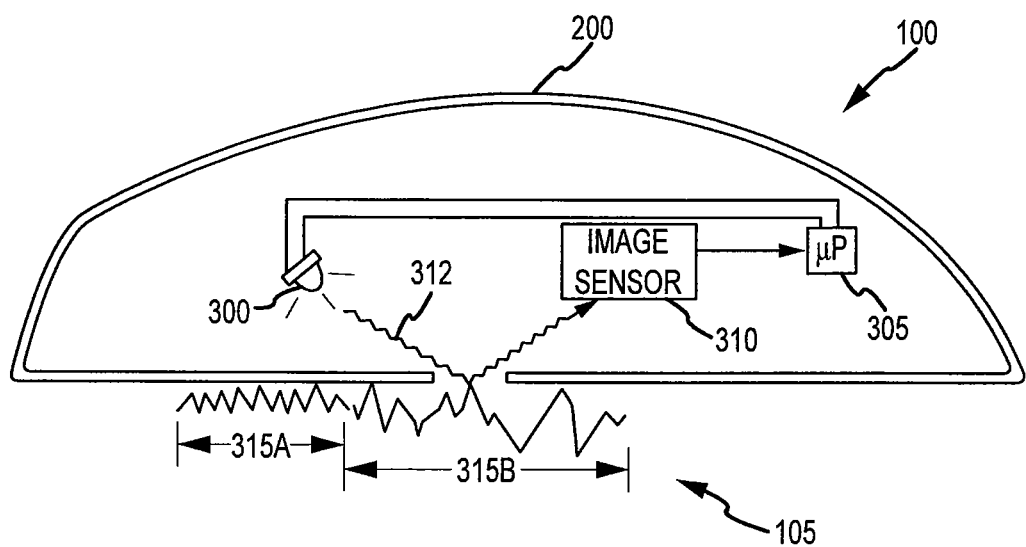
FIG. 3 illustrates a cross section of a mouse including a chromatic sensor.

In addition to embodying the mouse 100, the housing 200 may be configured to enclose and support the internal components of the mouse 100. For example, the housing 200 may contain the electronics that generate tracking and positional information associated with moving the indicator 103 on the screen 104. FIG. 3 illustrates a cross section of the mouse 100 taken through the housing 200 along the section line AA' shown in FIG. 2.

Figure 8:
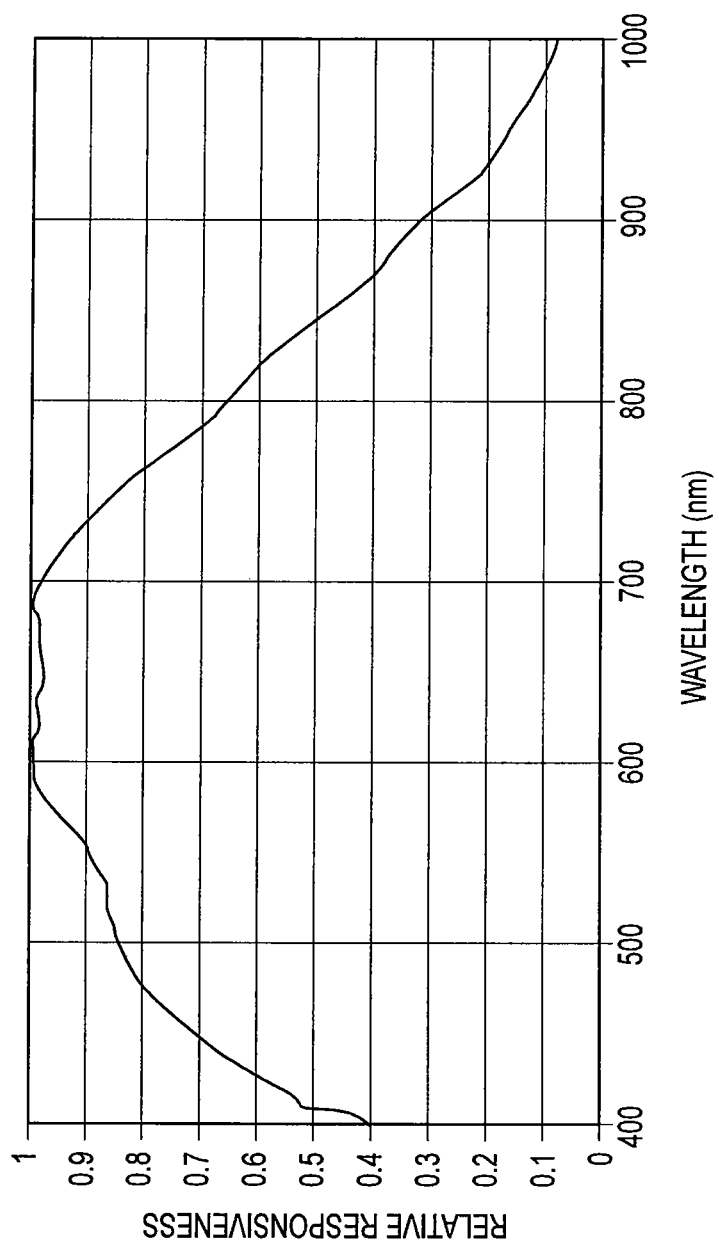
FIG. 8 illustrates a response of a chromatic sensor to various colored surfaces.

Referring now to FIG. 3, the mouse 100 is shown resting on a magnified view of a surface 105. As shown, the housing 200 may include one or more electronic components coupled together to optically sense the chromatic content of the surface 105. These electronic components may include a light source 300 electrically coupled to a microprocessor 305. The light source 300 may optically emit a laser or IR beam 312 that reflects from the surface and is detected by a chromatic sensor 310. The chromatic sensor 310 may also electrically couple to a microprocessor 305. Depending upon the particular embodiment, the light source 300 and chromatic sensor 310 may be implemented in one of a variety of forms. For example, in some embodiments, the chromatic sensor 310 may be a complementary metal oxide semiconductor (CMOS) sensor with a resolution of about 30×30 pixels. Additionally, the chromatic sensor 310 may be configured to detect various wavelengths of the visible spectrum, such as red, green, and blue (RGB) to name but a few. FIG. 8 illustrates the relative responsiveness of the chromatic sensor 310 (as depicted on the ordinate axis) versus wavelengths of light (as depicted on the abscissa axis). Because the chromatic sensor 310 may have different responsiveness to different wavelengths of light, the light source 300 may be tuned such that the beam 312 emanates at least the wavelengths that the chromatic sensor 310 detects. For example, the light source may be a white light source capable of emanating the wavelengths detected by the RGB sensor in addition to other wavelengths, or alternatively, some embodiments may emanate only the wavelengths detected by the chromatic sensor 310 and thereby curb the amount of power consumed by the light source 300, which may be important if the mouse 100 is battery powered. Embodiments of the light sources 300 that are capable of being tuned to emanate specific wavelengths in this manner include light emitting diodes (LEDs), lasers, such as vertical cavity surface emitting lasers (VCSELs), and the like. As will be described in further detail below, the responsiveness of the chromatic sensor 310 to various wavelengths of light (shown in FIG. 8) also may be used to increase the operation of the mouse 100 when placed on various colored surfaces.

As shown in FIG. 3, the magnified view of the surface 105 may include one or more regions 315A-B. During operation of the mouse 100, the light beam 312 emanating from the light source 300 may reflect off one or more of these regions 315A-B, and the reflected light may be captured by the chromatic sensor 310. Note that while the angle of reflection between the light source 300 and the chromatic sensor 310 shown in FIG. 3 is generally specular, it should be appreciated that the beam 312 may follow a variety of reflection paths, such as a path that is more oblique than that shown in FIG. 3. Furthermore, in the event that the surface 105 includes a glass overlay thereon, the angle of light reflected may vary, and at least some of the embodiments may be configured such that the chromatic sensor may capture the various resulting angles of reflection regardless of this varying angle.

Each of the different regions 315A-B may have different surface characteristics such as different textures, color contents, and/or glass overlays, and accordingly each of the different regions may reflect light back to the mouse 100 differently. According to at least one embodiment, the mouse 100 may change its operational characteristics based on the characteristics of the surface 105 as captured by the chromatic sensor 310. For example, in the embodiments where the regions 315A-B are different colors, the region 315A may be a surface where the chromatic sensor 310 is not as responsive to color as other colors, such as violet having a wavelength of approximately 400-450 nanometers as shown in FIG. 8. In this example, the chromatic sensor 310 may detect the color of the surface, which in this example is violet, and determine that the mouse's 100 tracking operations need to be modified to account for the color of the region 315A, such as by making the mouse 100 more sensitive in the region 315A. Similarly, as shown in FIGS. 3 and 8, if the region 315B is a surface where the chromatic sensor 310 is more responsive than the region 315A, for example if the region 315B is red having a wavelength of approximately 610-750 nanometers, then the tracking operations of the mouse 100 may be modified to account for the differences in color between the region 315A and 315B.

Figure 4:
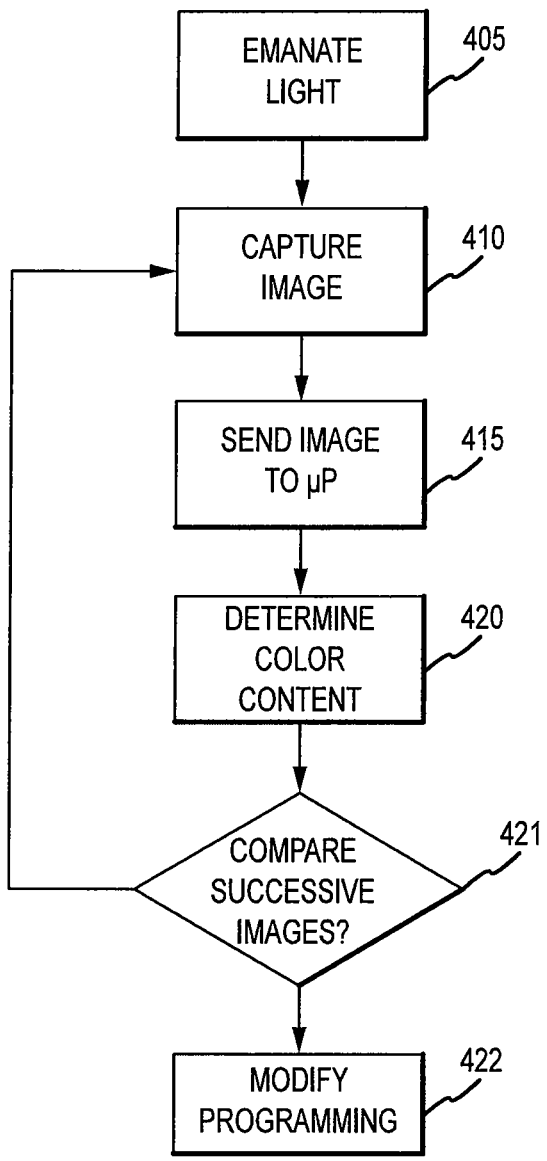
FIG. 4 illustrates operations for modifying the programming of a mouse including a chromatic sensor.

FIG. 4 illustrates operations that may be performed by the mouse 100 to modify its programming based on the color content of the surface 105. Referring to FIG. 4 in conjunction with the electronics shown in FIG. 3, the light source 300 may emanate light during operation 405. As mentioned previously, the precise wavelengths of light may be matched to the sensitivity of the chromatic sensor 310, such as the responsiveness shown in FIG. 8. Additionally, the power level and/or wavelengths of light that the light source 300 emanates may be adjusted, for example, to accommodate a situation where the surface 105 includes a glass overlay. In this manner, the light emanated during operation 405 may be tuned for different thicknesses of overlay and/or varying angles of reflection.

Next, in operation 410, as the beam 312 reflects off the surface 105, the chromatic sensor 310 may capture the reflected light. That is, the chromatic sensor 310 may take snapshots of the surface 105 over the various regions 315A-B. In some embodiments, the speed at which these snapshots may be taken, referred to as "refresh rate" of the chromatic sensor 310, may vary based upon the color content of the surface 105. For example, in some embodiments, when the color content sampled by the chromatic sensor 310 reveals that the surface 105 is a color that the chromatic sensor 310 is not as responsive to, such as violet (e.g., region 315A), then the mouse 100 may have a refresh rate of approximately 6,000 samples per second. On the other hand, in this same example, if the color content sampled by the chromatic sensor 310 reveals that the surface 105 is a color that the chromatic sensor 310 is more responsive to than region 315A, such as red, then the refresh rate of the mouse 100 may be decreased, to say 1,500 samples per second. As a result of changing the refresh rate of the chromatic sensor 310, the power consumed by the chromatic sensor 310 may vary, and when combined with the above mentioned power savings of the light source 300, the overall power consumed by the mouse 100 may be reduced. This may be especially desirable in the event that the mouse 100 is battery powered. Other aspects of the operation of the mouse 100 (alone or in combination with the refresh rate) may be changed based upon the characteristics of the surface 105. For example, the power level of the light source 300 may be adjusted based upon the characteristics of the surface 105.

Once the image of the surface 105 has been captured by the chromatic sensor 310 (per operation 410), the image may be conveyed to the microprocessor 305 for processing per operation 415. Subsequently, the microprocessor 305 may determine the color content of the snapshot received from the chromatic sensor 310 in operation 420. In some embodiments, this determination may be based upon a pixel-by-pixel comparison to determine the relative RGB levels of each pixel of the chromatic sensor 310. Note that in the embodiments where the chromatic sensor 310 is a grayscale sensor, then this pixel-by-pixel comparison may be performed faster. In still other embodiments, instead of comparing the snapshot on a pixel-by-pixel basis, the snapshot may be averaged to determine the average chromatic content and then a comparison of this averaged value may be made to perform the comparison faster.

As part of the determination of the color content of operation 420, the microprocessor 305 may compare the images received from the chromatic sensor 310 to a standard image and/or one or more subsequent image samples. In other words, some embodiments may include comparing images received from the chromatic sensor 310 to a standard image value stored within the microprocessor 305. The standard image may include known RGB levels, and the microprocessor 305 may make a determination of the color content (per operation 420) by comparing the known RGB levels in the standard image to the levels in the images received from the chromatic sensor 310.

A decision operation 421 illustrates making a determination as to whether to compare successive images from the chromatic sensor 310 in operation 420. In the event successive images are not desired, control flows to operation 422.

In operation 422, the programming of the microprocessor 305 may be modified based upon the color content of the surface 105. Depending upon the aforementioned resolution and refresh rate of the chromatic sensor 310, the image processing rate may vary between embodiments. For example, the range of image processing rates may vary between about 0.4 and about 5 megapixels per second with the aforementioned resolutions and/or refresh rates. Accordingly, altering the programming per operation 422 may involve altering the refresh rate of the chromatic sensor 310 and/or the power level of the light source 300 in order to conserve power. Thus, if the mouse 100 is operating on a gray surface, as opposed to a white surface, then the power consumption of the mouse 100 may be reduced because the gray surface may be tracked at a lower refresh rate than the white surface.

Alternatively, in other embodiments, altering the programming per operation 422 may involve using adjusting the sensitivity of the mouse 100 based upon the responsiveness of the mouse 100 versus the color of the surface 105. For example, if the surface 105 is white (as detected by the chromatic sensor 310 sensing multiple constituent wavelengths), then there may not be enough contrast between the reflected constituent wavelengths of the surface 105 for the mouse 100 to track the surface 105 in the same manner that the mouse 100 may have tracked a poly-chromatic surface. In this manner, operation 422 may involve adjusting the sensitivity of the mouse 100 in the event that the surface 105 lacks sufficient contrasting wavelengths.

Referring still to the decision to compare successive images shown in operation 421, in the event that successive comparisons are desired, control may flow back to operation 410 where another image from the chromatic sensor 310 may be captured (per operation 410), conveyed to the microprocessor (per operation 415), and then used to determine the color content of the samples per operation 420. Thus in some embodiments, comparisons made during operation 420 may be made between subsequent images as they are received from the chromatic sensor 310. For example, the microprocessor 305 may compare the differences in the RGB levels, on a pixel-by-pixel basis, for each pixel in the chromatic sensor 310 as the mouse 100 moves between the regions 315A-B. This comparison may allow the programming of the microprocessor 305 to be modified so that refresh rates of the chromatic sensor 310 and/or power levels of the light source 300 may be modified dynamically as the mouse 100 moves across different regions 315A-B of the surface 105.

In addition to allowing the programming of the mouse 100 to be dynamically modified, inclusion of the chromatic sensor 310 in the mouse 100 also may allow the mouse 100 to render images on the surface of its housing 200. For example, as illustrated in the embodiment of a mouse 500 shown in FIG. 5, the mouse 500 may utilize a chromatic sensor to optically sample an image on the surface 105 and render the image onto a housing 505 of the mouse 500 using a display that is contained within the housing 505.

Figure 5:
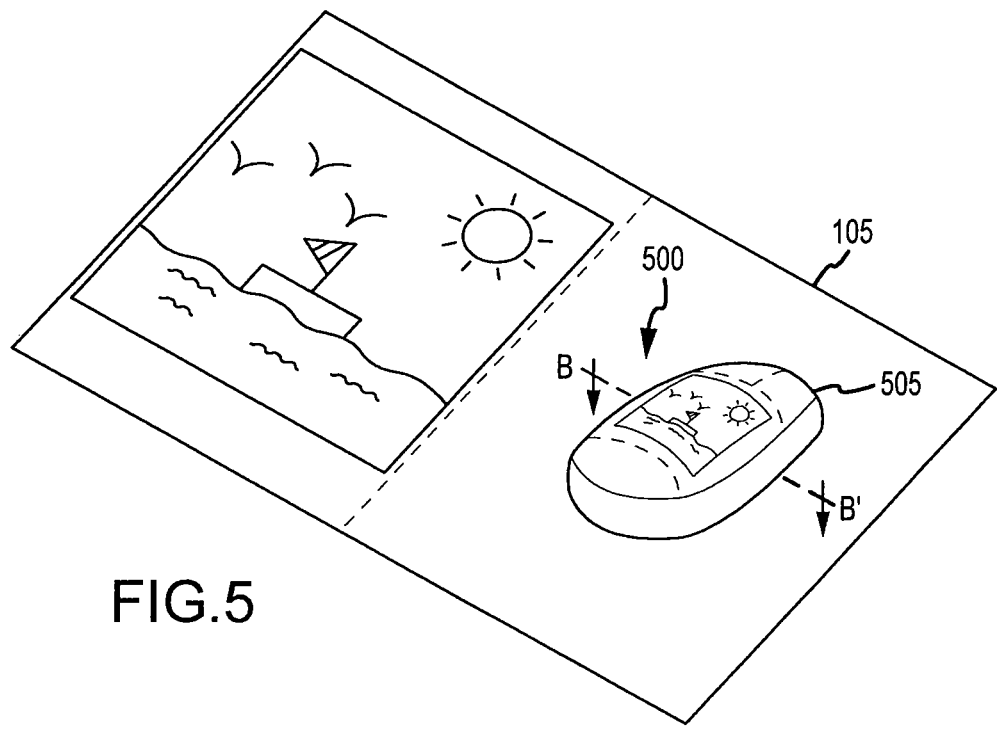
FIG. 5 illustrates a perspective view of a mouse capable of rendering an image on its housing.
Figure 6:
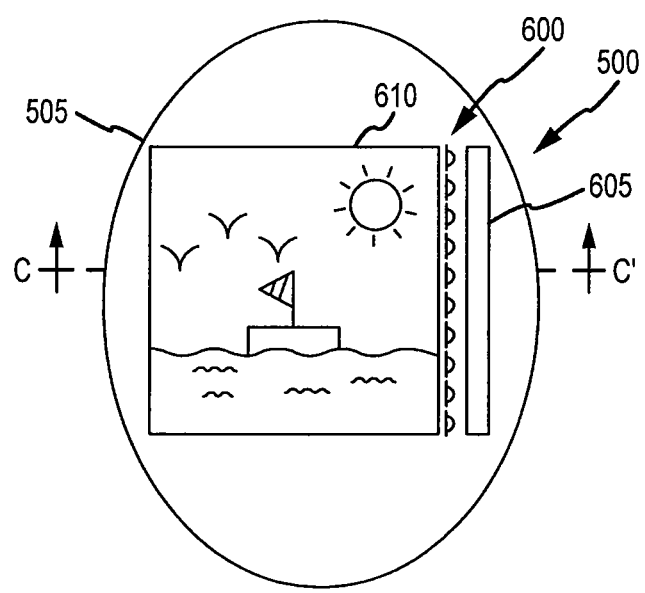
FIG. 6 illustrates a top down view of a mouse capable of rendering an image on its housing.

FIG. 6 illustrates a top down view of the mouse 500 taken through the BB' section line of FIG. 5. As shown in FIG. 6, the mouse 500 may include an array of light sources 600 that optically couple to an array of chromatic sensors 605. In some embodiments, the chromatic sensors 605 may be oriented lengthwise in a direction that is parallel to the direction that a user holds the mouse 500. Also, although not specifically shown in FIG. 6, the angular positioning of the array of light sources 600 with respect to the array of chromatic sensors 605 may include various angles. That is, in some embodiments, a portion of the light sources 600 may be positioned such that they have a specular angle of reflection while another portion of the light sources 600 may be positioned such that they have an oblique angle of reflection.

Figure 7:
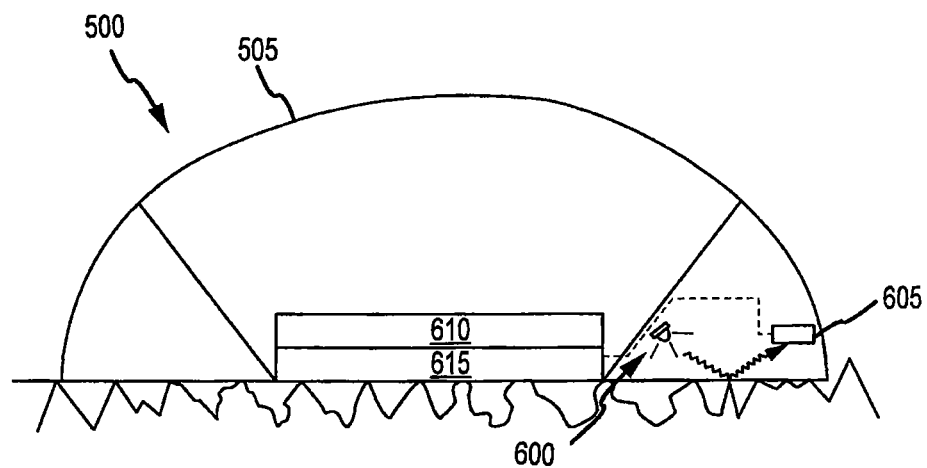
FIG. 7 illustrates a cross section of a mouse capable of rendering an image on its housing.

The mouse 500 may further include a display 610 coupled to the chromatic sensor 605. For example, FIG. 7 illustrates a cross section of the mouse 500 taken along the section line CC' where the chromatic sensor 605 couples to the display 610 via a microprocessor 615 that is located beneath the display 610 as shown. In some embodiments, the display 610 may be an organic light-emitting diode (OLED). Generally, OLEDs include electrodes located on either side of the organic layers, thereby providing current to the organic layers and causing light to be emitted from the organic layers. The color of the light emitted by the OLED depends on the specific organic material used to make the OLED.

Alternatively, in other embodiments, the display 610 devices may be made using the organic materials that emit white light and an array of color filters (CFAs) is located over the display 610 of light emitting elements. Furthermore, in some embodiments, the housing 505 may be manufactured using materials that allow images from the display 610 to be rendered on the surface of the housing 505. For example, such materials may include clear plastic, collimated glass, and the like.

During operation of the mouse 500, the user may move the mouse 500 across an image on the surface 105. As the mouse 500 moves across the image, a strip of the image may be captured by the combination of the light sources 600 and chromatic sensors 605 taking repetitive snapshots of the image as the mouse 500 moves. In this manner, the mouse 500 may operate like a strip scanner and allow the image on the surface 105 to be captured in strips. The microprocessor 615 would then combine or stitch these strips together to render the image. As shown in FIG. 5, the microprocessor 615 may convey the processed image (i.e., the combination of the strips) to the display 610 and the image may be conveyed through the housing 505. Thus, the user may use the mouse 500 to view and/or sample the image without the need for a computer system. In other embodiments, the user may use the mouse as a virtual magnifying glass that displays magnified portions of the image on the housing 505 prior to displaying them on a computer system.

What is claimed is:

1. A mouse comprising:
   a light source;
   an image sensor coupled to the light source; and
   a microprocessor coupled to the image sensor, wherein the microprocessor is programmed to modify, a responsiveness of the mouse based upon feedback from the image sensor, such that the responsiveness of the mouse is a function of a chromatic content of the surface on which the mouse is operating;
   wherein:
   the function comprises a domain having a first wavelength band within which increases in wavelength result in increases in the responsiveness of the mouse; and
   the domain of the function has a second wavelength band within which increases in wavelength result in the responsiveness of the mouse remaining substantially constant, the second wavelength band being greater than the first wavelength band.

2. The mouse of claim 1, wherein the image sensor is a chromatic sensor.

3. The mouse of claim 2, wherein the chromatic sensor is a red-green-blue (RGB) sensor.

4. The mouse of claim 2, wherein a refresh rate of the image sensor is modified based upon the microscopic texture of a surface upon which the mouse is operating.

5. The mouse of claim 2, further comprising a display coupled to the microprocessor, wherein the display is capable of displaying an image from the sensor.

6. The mouse of claim 5, further comprising a housing coupled to the display, wherein the housing is capable of displaying the image on its surface.

7. The mouse of claim 1, wherein the domain of the function has a third wavelength band within which increases in wavelength result in decreases in the responsiveness of the mouse, the third wavelength band being greater than the second wavelength band.

* * * * *